(12) United States Patent
Corson

(10) Patent No.: US 7,694,223 B2
(45) Date of Patent: Apr. 6, 2010

(54) METHODS AND SYSTEMS FOR RECORDING USER ACTIONS IN COMPUTER PROGRAMS

(75) Inventor: Gregory Corson, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 682 days.

(21) Appl. No.: 10/833,470

(22) Filed: Apr. 27, 2004

(65) Prior Publication Data

US 2004/0261026 A1 Dec. 23, 2004

Related U.S. Application Data

(60) Provisional application No. 60/476,084, filed on Jun. 4, 2003.

(51) Int. Cl.
*G06F 3/00* (2006.01)
(52) U.S. Cl. ..................................... 715/704; 715/714
(58) Field of Classification Search .................. 715/708, 715/714, 745, 704
See application file for complete search history.

(56) References Cited

U.S. PATENT DOCUMENTS 5,103,498 A 4/1992 Lanier et al.
6,434,532 B2 * 8/2002 Goldband et al. ............... 705/7
6,549,216 B1 4/2003 Schumacher et al.
6,973,478 B1 * 12/2005 Ketonen et al. ............. 709/203
7,047,498 B2 * 5/2006 Lui et al. ..................... 715/762
7,127,473 B2 * 10/2006 Agassi et al. ........... 707/103 R
2001/0018673 A1 8/2001 Goldband et al.
2002/0126140 A1 * 9/2002 Gorbet et al. ............... 345/708

OTHER PUBLICATIONS

C.G. Thomas and G. Fischer: "Using Agents to Improve the Usability and the Usefulness of the World-Wide Web", Proceedings of the 5th International Conference on User modeling, 1996, pp. 5-12, XP002344163.

* cited by examiner

*Primary Examiner*—Dennis Bonshock
(74) *Attorney, Agent, or Firm*—Martine Penilla & Gencarella, LLP

(57) ABSTRACT

A method for recording a sequence of user actions made when interfacing with objects associated with an executable code is provided. In this method, a selection of a level of detail to record when user actions enable interfacing with the objects associated with the executable code is enabled. Subsequently, the sequence of user actions is recorded. The recorded sequence of user actions is defined by the selected level of detail. Thereafter, the recorded sequence of user actions is parsed by applying rules that enable the generation of a defined number of data types. The data types are capable of being utilized by an application that is designed to generate information that is related to one or more of the data types.

6 Claims, 8 Drawing Sheets

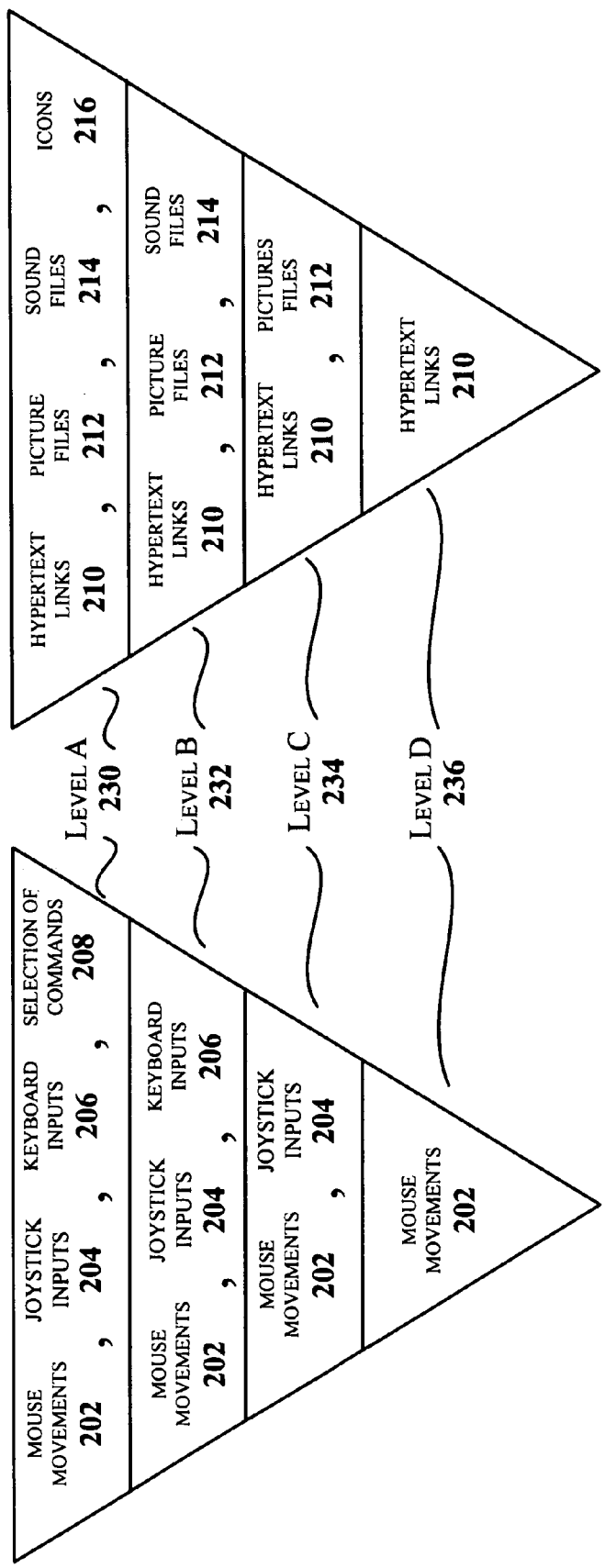

METHODS AND SYSTEMS FOR RECORDING USER ACTIONS IN COMPUTER PROGRAMS

CROSS REFERENCE TO RELATED APPLICATION

This application claims the benefit of U.S. Provisional Application No. 60/476,084, filed Jun. 4, 2003. The disclosure of the provisional application is incorporated herein by reference.

BACKGROUND OF THE INVENTION

1. Field of the Invention

The present invention relates to recording data and, more particularly, to methods and systems for utilizing a series of recorded user actions on a computer.

2. Description of the Related Art

When interfacing with a computer program, a user takes a series of actions. Examples of such actions include moving a mouse, clicking on an icon or button, and typing texts. Currently, some computer applications can record actions by the user. However, the recording is limited. For example, many applications have a macro feature that shortens long commands or menu sequences. Essentially, a macro recorder records a sequence of actions taken by the user when interfacing with an application. The recorded sequence of actions may then be repeated such that the user does not need to repeat the same actions. A disadvantage of existing macro recorders is that recording is limited to recording a short sequence of commands and actions that are only useful for shortening common user commands. The existing macro recorders cannot determine what the user is actually doing or working on. Further, the only actions that are recordable are limited to pre-specified commands.

Another example is a Web browser feature that tracks the history of Web sites visited. The tracking feature keeps a history of the Web sites visited along with the date. However, the tracking feature doesn't track details such as how the user got to the Web sites, the amount of time spent browsing the Web sites, and the order in which the Web sites were visited. Another example is a replay feature typically found in many video games. The video games basically record user actions during game play and replays the actions at a later time. However, the problem with the replay feature is that the recording cannot be edited or utilized outside the particular video game.

As a result, there is a need to provide methods and systems for recording any actions taken by the user when interfacing with one or more computer programs, and the actions can be saved, edited, and utilized by other programs.

SUMMARY OF THE INVENTION

Broadly speaking, the present invention fills these needs by providing systems and methods to record a sequence of user actions made when interfacing with objects associated with an executable code. It should be appreciated that the present invention can be implemented in numerous ways, including as a process, an apparatus, a system, computer readable media, or a device. Several inventive embodiments of the present invention are described below.

In accordance with a first aspect of the present invention, a method for recording a sequence of user actions made when interfacing with objects associated with an executable code is provided. In this method, a selection of a level of detail to record when user actions enable interfacing with the objects associated with the executable code is enabled. Subsequently, the sequence of user actions is recorded. The recorded sequence of user actions is defined by the selected level of detail. Thereafter, the recorded sequence of user actions is parsed by applying rules that enable the generation of a defined number of data types. The data types are capable of being utilized by an application that is designed to generate information related to one or more of the data types.

In accordance with a second aspect of the present invention, a computer readable medium having program instructions for retrieving related information based a sequence of user actions made when interfacing with objects associated with an executable code is provided. This computer readable medium includes program instructions for generating a defined number of data types where the defined number of data types is derived from the sequence of user actions. Thereafter, program instructions are included for providing the defined number of data types to a search engine where the search engine retrieves the related information. Subsequently, program instructions are included for displaying the related information.

In accordance with a third aspect of the present invention, a system for recording a sequence of user actions made when interfacing with objects associated with an executable code is provided. The system includes a memory for storing an automatic information retrieval module and a central processing unit for executing the automatic information retrieval module stored in the memory. The automatic information retrieval module includes logic for enabling selection of a level of detail to record when user actions enable interfacing with the objects associated with the executable code; logic for recording the sequence of user actions wherein the recorded sequence of user actions is defined by the selected level of detail; and logic for parsing the recorded sequence of user actions by applying rules that enable generation of a defined number of data types.

In accordance with a fourth aspect of the present invention, a system for recording a sequence of user actions made when interfacing with objects associated with an executable code is provided. The system includes recording means for recording the sequence of user actions in a memory and parsing means for parsing the recorded sequence of user actions by applying rules that enable the generation of a defined number of data types.

In accordance with a fifth aspect of the present invention, a method for recording a sequence of user actions made when interfacing with objects associated with an executable code is provided. In this method, a sequence of user actions is recorded. Thereafter, the recorded sequence of user actions is parsed by applying rules that enable the generation of a defined number of data types. The data types are capable of being utilized by an application that is designed to generate information related to one or more of the data types.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 2A is a simplified diagram of levels of detail to record for user actions, in accordance with one embodiment of the present invention.

FIG. 2B is a simplified diagram of levels of detail to record for objects, in accordance with one embodiment of the present invention.

DETAILED DESCRIPTION OF THE EXEMPLARY EMBODIMENTS

An invention is disclosed for methods and systems for recording a sequence of user actions. In the following description, numerous specific details are set forth in order to provide a thorough understanding of the present invention. It will be understood, however, by one of ordinary skill in the art, that the present invention may be practiced without some or all of these specific details. In other instances, well known process operations have not been described in detail in order not to unnecessarily obscure the present invention.

The embodiments described herein provide methods and systems for recording a sequence of user actions made when interfacing with objects associated with executable codes. As will be explained in more detail below, the recording can be played back, edited, and utilized by other applications to generate related information.

Figure 1A:
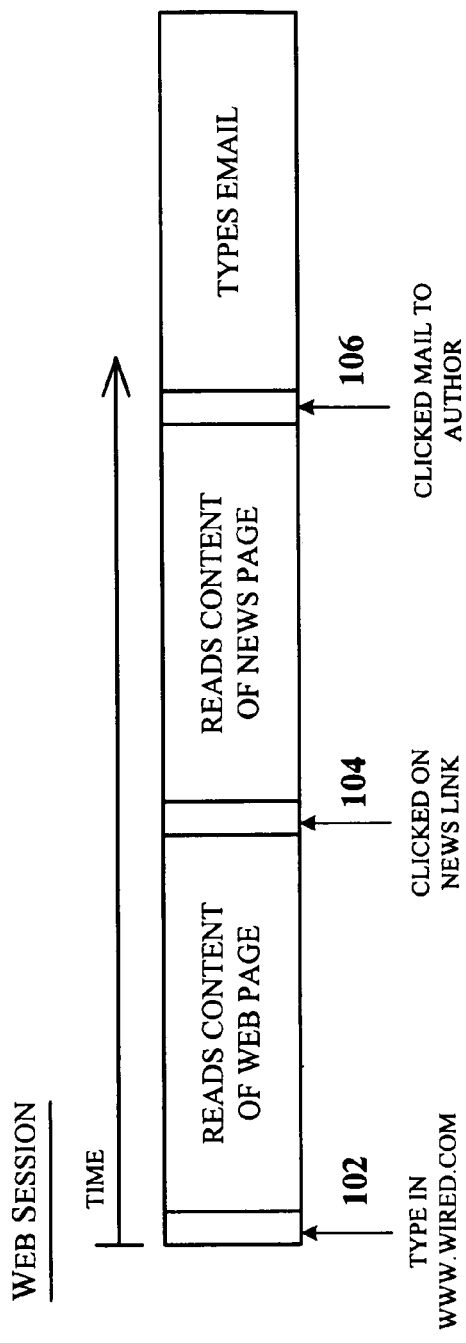
FIG. 1A is a simplified block diagram of an exemplary sequence of user actions taken when browsing the Web, in accordance with one embodiment of the present invention.
Figure 1B:
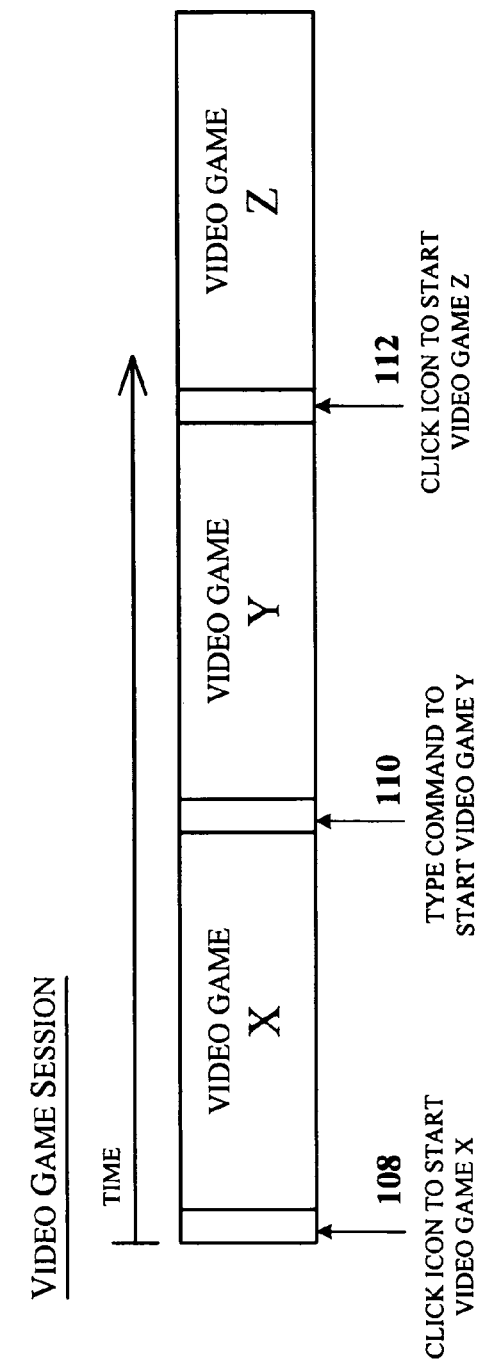
FIG. 1B is a simplified block diagram of another exemplary sequence of user actions taken when playing video games, in accordance with one embodiment of the present invention.

FIGS. 1A and 1B are simplified block diagrams illustrating a sequence of user actions taken over a time period, in accordance with one embodiment of the present invention. A user takes a series of actions when interfacing with objects associated with executable codes. Examples of user actions include keyboard inputs, mouse movements, mouse inputs, light pen inputs, joystick inputs, selecting a choice from a menu, selecting an object, selecting a command, etc. The user may interface with objects that include commands, instructions, hypertext links, data, data traversing network connections, icons, files, picture files, sounds files, movie files, texts, menus associated with executable codes, etc. Exemplary executable codes can be any piece of code, and can be part of applets, operating systems, video games, World Wide Web (Web) browsers, word processors, spreadsheet programs, search engines, dictionary applications, encyclopedia applications, email programs, etc.

FIG. 1A is a simplified block diagram of an exemplary sequence of user actions taken when browsing the Web, in accordance with one embodiment of the present invention. As shown in FIG. 1A, at arrow reference 102, the first action taken by the user is typing in a Web address "www.wired-.com." The user then reads the contents (i.e., objects) of the www.wired.com Web page for a period of time. Thereafter, at arrow reference 104, the user takes a second action by clicking on a hypertext news link located on the Web page. The second user action invokes the linked news page and the user reads the news page for a period of time. Finally, at arrow reference 106, the user takes a third action by clicking on an email address link on the Web page to an author of the news page. Thereafter, the user types an email message to the author.

FIG. 1B is a simplified block diagram of another exemplary sequence of user actions taken when playing video games, in accordance with one embodiment of the present invention. As shown in FIG. 1B, at arrow reference 108, the first action taken by the user is clicking on an icon to start video game X. The user then plays video game X for a period of time. Thereafter, at arrow reference 110, the user takes a second action by typing in a command to start video game Y. The second user action starts video game Y and the user plays video game Y for a period of time. Finally, at arrow reference 112, the user takes a third action by clicking on another icon to start video game Z. Thereafter, the user plays video game Z for a period of time.

As will be explained in more detail below, during the exemplary Web and video game sessions, the sequence of user actions (e.g., clicking on hypertext links, typing in commands, typing in email message, and clicking on icons) and objects associated with the Web pages and video games (e.g., content of Web page, content of news page, and video game contents) may be recorded. In one embodiment, user actions are automatically recorded throughout the user's computer session. A session starts when the computer is turned on and ends when the computer is turned off. A session includes one or many sub-sessions. A sub-session is time spent with an application and each session and sub-session can be any length of time. Exemplary sub-sessions include time spent interfacing with a video game, a word processing program, a Web browser, etc. In one embodiment, the recording may be limited to one or more sub-sessions. In another embodiment, during the user's computer session, the user may set a fixed period of time for recording.

FIGS. 2A and 2B are simplified block diagrams illustrating levels of detail to record, in accordance with one embodiment of the present invention. In one embodiment, all user actions and objects associated with an executable code may be recorded. In another embodiment, the user may additionally specify a level of detail to record whereby the recording is limited to certain user actions and objects. For example, FIG. 2A is a simplified diagram of levels of detail to record for user actions, in accordance with one embodiment of the present invention. At level A 230, user actions such as mouse movements 202, joystick inputs 204, keyboard inputs 206, and selection of commands 208 are recorded. However, as shown in level B 232, the user may limit the recording to certain user actions, such as mouse movements 202, joystick inputs 204, and keyboard inputs 206. At level C 234, the user may further limit the recording to mouse movements 202 and joystick inputs 204. Ultimately, at level D 236, the user may limit recording to mouse movements 202 only.

In addition to recording a sequence of user actions, objects associated with the executable code may also be recorded, in accordance with another embodiment of the present invention. Since the user may specify a level of detail to record for user actions, the user may also specify the level of detail to record for objects associated with the executable code. For example, FIG. 2B is a simplified diagram of levels of detail to record for objects, in accordance with one embodiment of the present invention. At level A 230, objects such as hypertext links 210, picture files 212, sound files 214, and icons 216 associated with the executable code are recorded. However, as shown in level B 232, the user may limit the recording to certain objects, such as hypertext links 210, picture files 212, and sound files 214. At level C 234, the user may further limit the recording to hypertext links 210 and picture files 212. Ultimately, at level D 236, the user may limit the recording to hypertext links 210 only.

Figure 3:
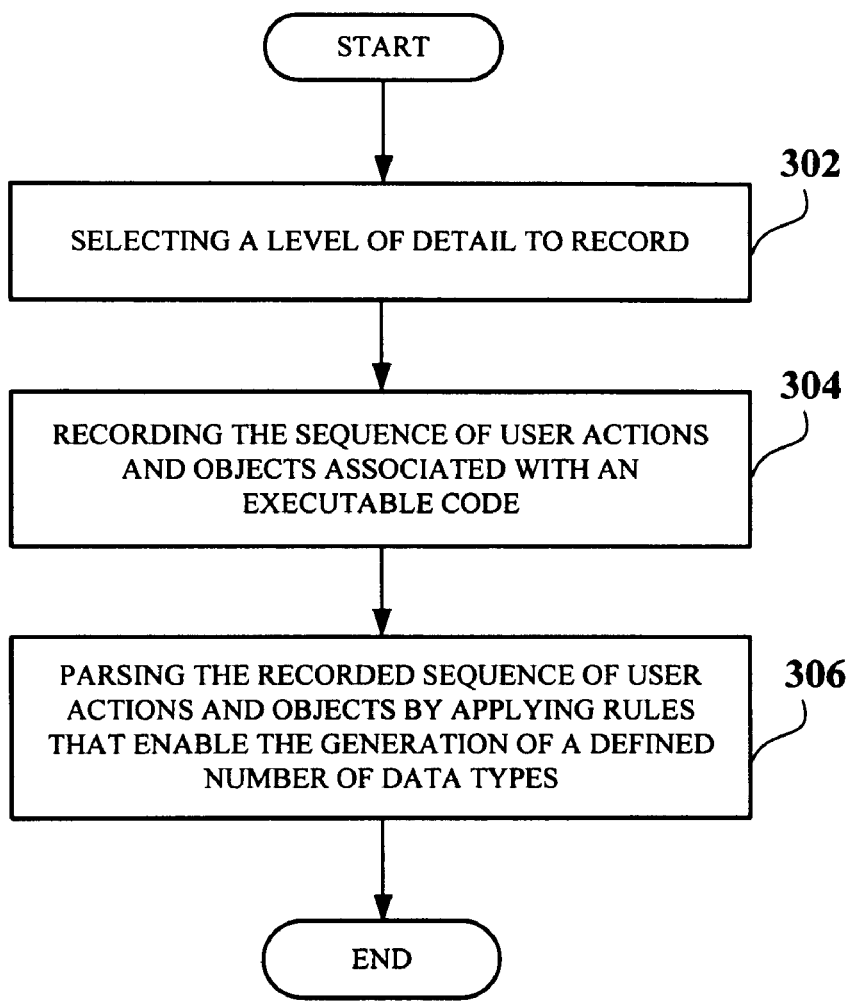
FIG. 3 is a flowchart diagram of the method operations for recording a sequence of user actions made when interfacing with objects associated with an executable code, in accordance with one embodiment of the present invention.

FIG. 3 is a flowchart diagram of the method operations for recording a sequence of user actions made when interfacing with objects associated with an executable code, in accordance with one embodiment of the present invention. Starting in operation 302, the user selects a level of detail to record. Alternatively, in one embodiment, the user does not need to select a level of detail to record. Instead, by default, all user actions and objects are automatically recorded. Thereafter, in operation 304, a sequence of user actions and objects are recorded whereby the recorded sequence of user actions and recorded objects are defined by the selected level of detail. As shown in FIG. 3, both the sequence of user actions and objects are recorded. However, in another embodiment, the user may select to record either the sequence of user actions or the objects associated with the executable code. Furthermore, the recording is not limited to one executable code. Instead, user actions and objects of more than one executable code can be simultaneously recorded.

Subsequently, in operation 306, the recorded sequence of user actions and recorded objects are parsed by applying rules. The rules define procedures for parsing the sequence of user actions and objects. For example, the rule may be defined by a user search request. For instance, the user has an interest in dogs. Thus, the user defines a rule that specifies the inclusion of user actions and objects that contain the term "dog." The rule may additionally be defined by a frequency of repeated user actions and objects. For instance, the user wants the computer to automatically determine his favorite subject based on his actions. As a result, the user actions and objects are counted and a rule is defined that specifies the inclusion of the most frequently repeated user actions and objects. On the other hand, if the user wants the computer to automatically determine his least favorite subject based on his actions, a rule is then defined that specifies the inclusion of the least frequently repeated user actions and objects.

Another exemplary rule may be defined by a length of time of user actions and time spent on objects. For example, the user again wants the computer to automatically determine his favorite subject based on his actions. Instead of counting user actions and objects as discussed above, a rule is defined that specifies the inclusion of objects with the largest amount of user's spent time. Thus, if the user spends a large amount of time at Web sites about "hunting dogs" and very little time on Web sites about other dog breeds and activities, an inference can be made that the user has an interest in hunting and hunting dogs. Based on the user's interest, rules and procedures may be created for finding more sites about hunting and hunting dogs. Additionally, further inferences can be made by analyzing the Web sites and the amount of time the user spends on the Web sites. For example, if the user spends very little time on general hunting sites, an inference can be made that the user is more interested in hunting dogs themselves rather than the actual sport of hunting.

The parsing of the recorded sequence of user actions and recorded objects enables the generation of a defined number of data types. In other words, the defined number of data types are derived from the sequence of user actions and objects. The data types are parsed data attributed to the recorded sequence of user actions and recorded objects. Exemplary data types include program names, inputted data, icon names, file names, command names, hypertext names, picture names, Web addresses, email texts, message texts, sound names, etc. As will be explained in more detail below, the data types are capable of being utilized by applications that are designed to generate information that are related to the data types.

Figure 4:
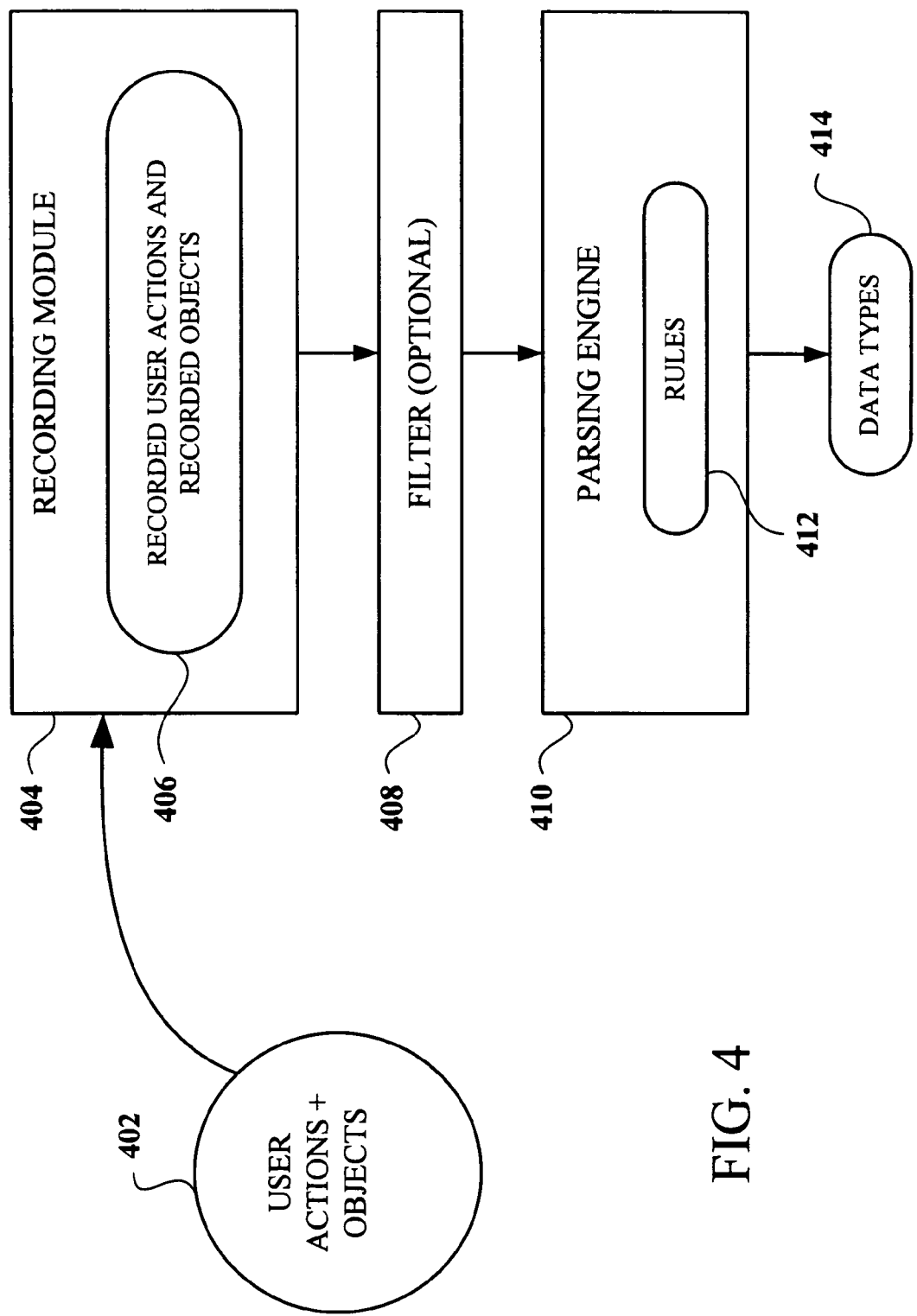
FIG. 4 is a simplified block diagram of a system for recording a sequence of user actions made when interfacing with objects associated with an executable code, in accordance with one embodiment of the present invention.

FIG. 4 is a simplified block diagram of a system for recording a sequence of user actions made when interfacing with objects associated with an executable code, in accordance with one embodiment of the present invention. As shown in FIG. 4, the system includes recording module 404, filter 408, and parsing engine 410. Recording module 404 records user actions and objects 402 as data in a memory (e.g., random-access memory (RAM), read-only memory (ROM), hard disk, tape, floppy disk, optical disk, etc.). In one embodiment, recorded user actions and recorded objects 406 are indexed by time. In another embodiment, recorded user actions and recorded objects 406 are recorded without reference to time.

Subsequently, in one embodiment, recording module 404 provides recorded user actions and recorded objects 406 to filter 408. Filter 408 removes recorded user actions and recorded objects 406 that are redundant. As a result, filter 408 reduces the size of the file that stores the recorded user actions and recorded objects 406. In effect, filter 408 compresses the file that stores recorded user actions and recorded objects 406. Advantageously, the reduction of the file size reduces the amount of memory required to store the file and reduces the processing power to process the file. In addition to removing redundant recorded user actions and recorded objects 406, filter also counts and keeps a record of the number of recorded user actions and recorded objects 406 removed. Such counts may be subsequently used in determining the frequency of recorded user actions and recorded objects 406. Filter 408 is optional and, in another embodiment, recording module 404 bypasses the filter and directly provides recorded user actions and recorded objects 406 to parsing engine 410.

Parsing engine 410 then parses the recorded user actions and recorded objects 406 by applying rules 412 that enable the generation of a defined number of data types 414. Data types 414 are capable of being utilized by applications that are designed to generate information that is related to the data types. As will be explained in more detail below, such exemplary applications include search engines, Internet music and movie shopping services, encyclopedia applications, dictionary applications, etc.

Figure 5:
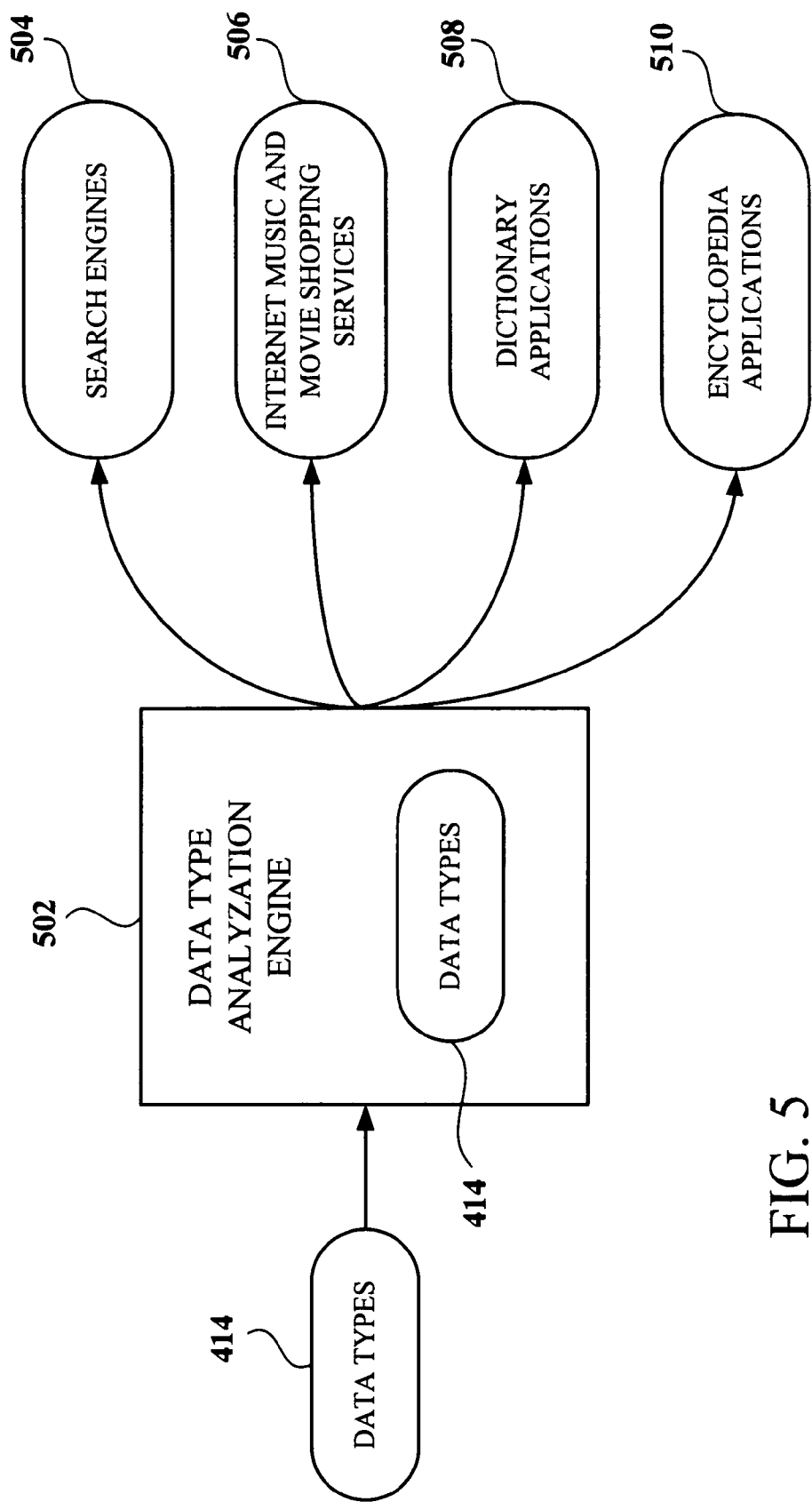
FIG. 5 is a simplified block diagram of a system for providing a defined number of data types to various applications, in accordance with one embodiment of the present invention.

FIG. 5 is a simplified block diagram of a system for providing a defined number of data types to various applications, in accordance with one embodiment of the present invention. As shown in FIG. 5, the system includes data type analyzation engine 502, search engines 504, Internet music and movie shopping services 506, dictionary applications 508, and encyclopedia applications 510. Data types 414 generated by a parsing engine are provided to data type analyzation engine 502. Data type analyzation engine 502 analyzes data types 414 and determines the compatibility of the data types with applications such as search engines 504, Internet music and movie shopping services 506, dictionary applications 508, and encyclopedia applications 510. For example, a data type with a hypertext link name is not compatible with Internet music and movie shopping services 506. As such, data type analyzation engine 502 would not provide the hypertext link name to Internet music and movie shopping services 506.

After analysis, data type analyzation engine 502 provides data types 414 to compatible applications. The applications can utilize data types 414 to generate information that is related to the data types. Examples of such applications include search engines 504 (e.g., Google, Yahoo, Excite, etc.), Internet music and movie shopping services 506 (e.g., Amazon, BMG Music, etc.), dictionary applications 508 (e.g., Webster's online, etc.), and encyclopedia applications 510 (e.g., Britannica.com, encyclopedia.com, etc.). For instance, the applications can generate information by using search engines 504 to find the information. In this exemplary case, data type analyzation engine 502 provides data type 414 with the term "dog" to search engines 504. Search engines 504 search over a network and retrieve documents that contain the term "dog." In addition to analyzing and providing data types 414 to applications, data type analyzation engine 502 can also organize and format the data types.

Figure 6:
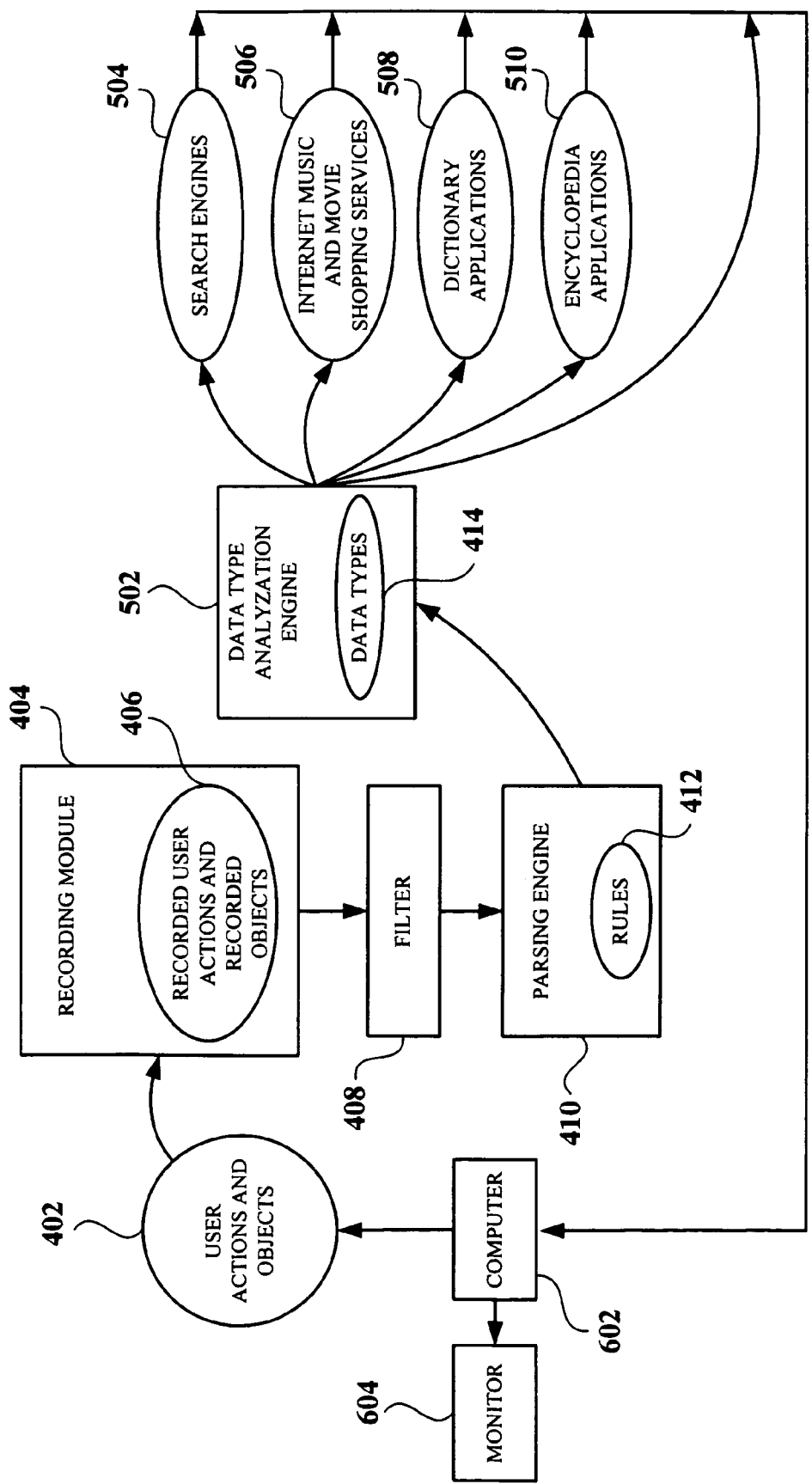
FIG. 6 is a simplified block diagram of a system for retrieving related information based on a sequence of user actions made when interfacing with objects associated with executable codes, in accordance with one embodiment of the present invention.

FIG. 6 is a simplified block diagram of a system for retrieving related information based on a sequence of user actions made when interfacing with objects associated with executable codes, in accordance with one embodiment of the present invention. As shown in FIG. 6, the system includes recording module 404, filter 408, parsing engine 410, computer 602, monitor 604, data type analyzation engine 502, search engines 504, Internet music and movie shopping services 506, dictionary applications 508, and encyclopedia applications 510.

As discussed above, in one embodiment, recording module 404 records user actions and objects 402 in a memory and provides recorded user actions and recorded objects 406 to filter 408. Filter 408 compresses recorded user actions and recorded objects 408 and provides the recorded user actions and recorded objects to parsing engine 410. Parsing engine 410 then parses the recorded user actions and recorded objects 406 by applying rules 412 that enable the generation of a defined number of data types 414.

Data types 414 generated by parsing engine 410 are provided to data type analyzation engine 502. In one embodiment, data type analyzation engine 502 analyzes data types 414 and provides the data types to suitable applications. The applications can utilize data types 414 to generate information that is related to the data types. As shown in FIG. 6, such applications include search engines 504, Internet music and movie shopping services 506, dictionary applications 508, and encyclopedia applications 510. The applications then provide the generated information to computer 602 for display on monitor 604. The related information may be generated automatically without requiring detection of user input. In another embodiment, instead of providing data types 414 to the applications, data type analyzation engine 502 directly provides the data types to computer 602 for display on monitor 604.

With the above embodiments in mind, recording module 406, filter 408, parsing engine 410, and data type analyzation engine 502 can be stored in a memory for subsequent execution by a central processing unit. Additionally, recording module 406, filter 408, parsing engine 410, and data type analyzation engine 502 may be grouped into a single automatic information retrieval module whereby the module can also be stored in the memory for subsequent execution by the central processing unit.

Figure 7:
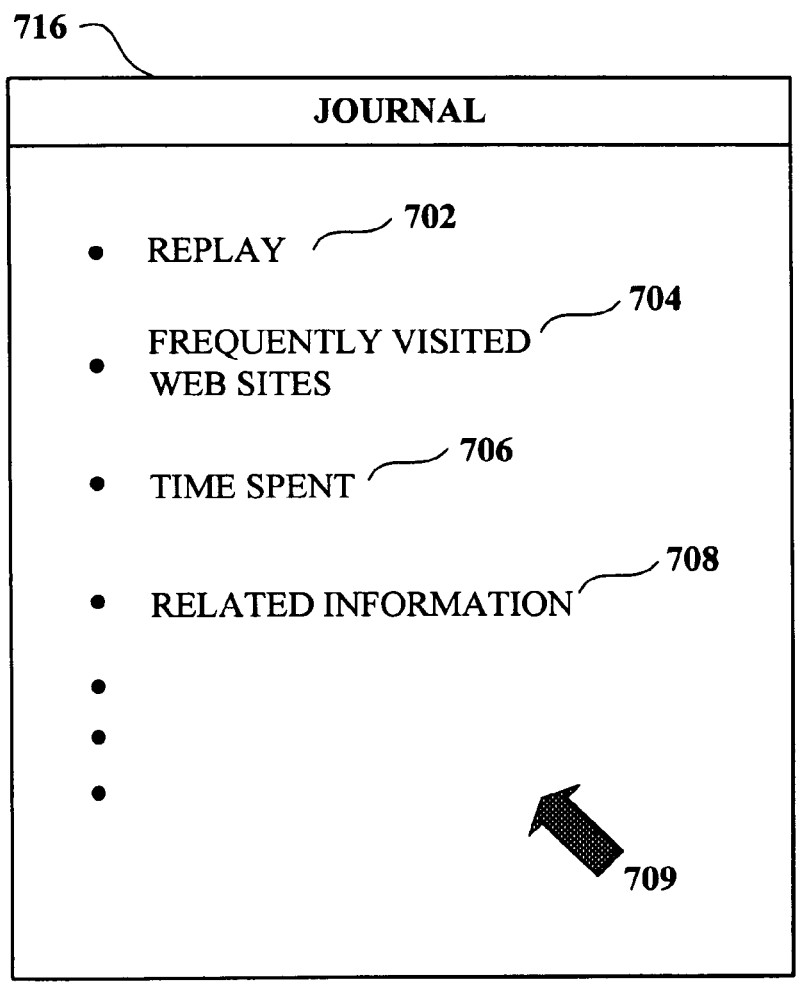
FIG. 7 is a schematic diagram of a main graphical interface (GUI), in accordance with one embodiment of the present invention.

FIG. 7 is a schematic diagram of a main graphical interface (GUI) of a journal, in accordance with one embodiment of the present invention. After user actions and objects are recorded, main window region 716 is displayed on a monitor. Main window region 716 displays various options that a user may select with cursor 709. As shown in FIG. 7, exemplary options include replay 702, frequently visited Web sites 704, time spent 706, and related information 708. Replay 702 replays the recorded user actions made when interfacing with objects associated with executable codes. As a result, the replay allows the user to share with other users a complete record of his experience of interfacing with objects associated with executable codes. For instance, the replay visually shows other users how to do and find objects by retracing the user's actions.

Further, frequently visited Web sites 704 displays the Web sites most frequently visited. In this case, the frequently visited Web sites could be automatically shown at a later date such that the user doesn't need to manually access these commonly visited Web sites. This option could show the frequently visited Web sites like a news broadcast where, when the user gets up in the morning, a television automatically shows the frequently visited Web sites the user normally visits in the morning.

Time spent 706 shows the amount of time spent interfacing with objects (e.g., time spent browsing on Web sites, time spent playing video games, etc.) By selecting related information 708, the system retrieves information related to the sequence of user actions made when interfacing with objects associated with executable codes. Other exemplary options include, the least frequently visited Web sites and Web sites with the least time spent.

Figure 8:
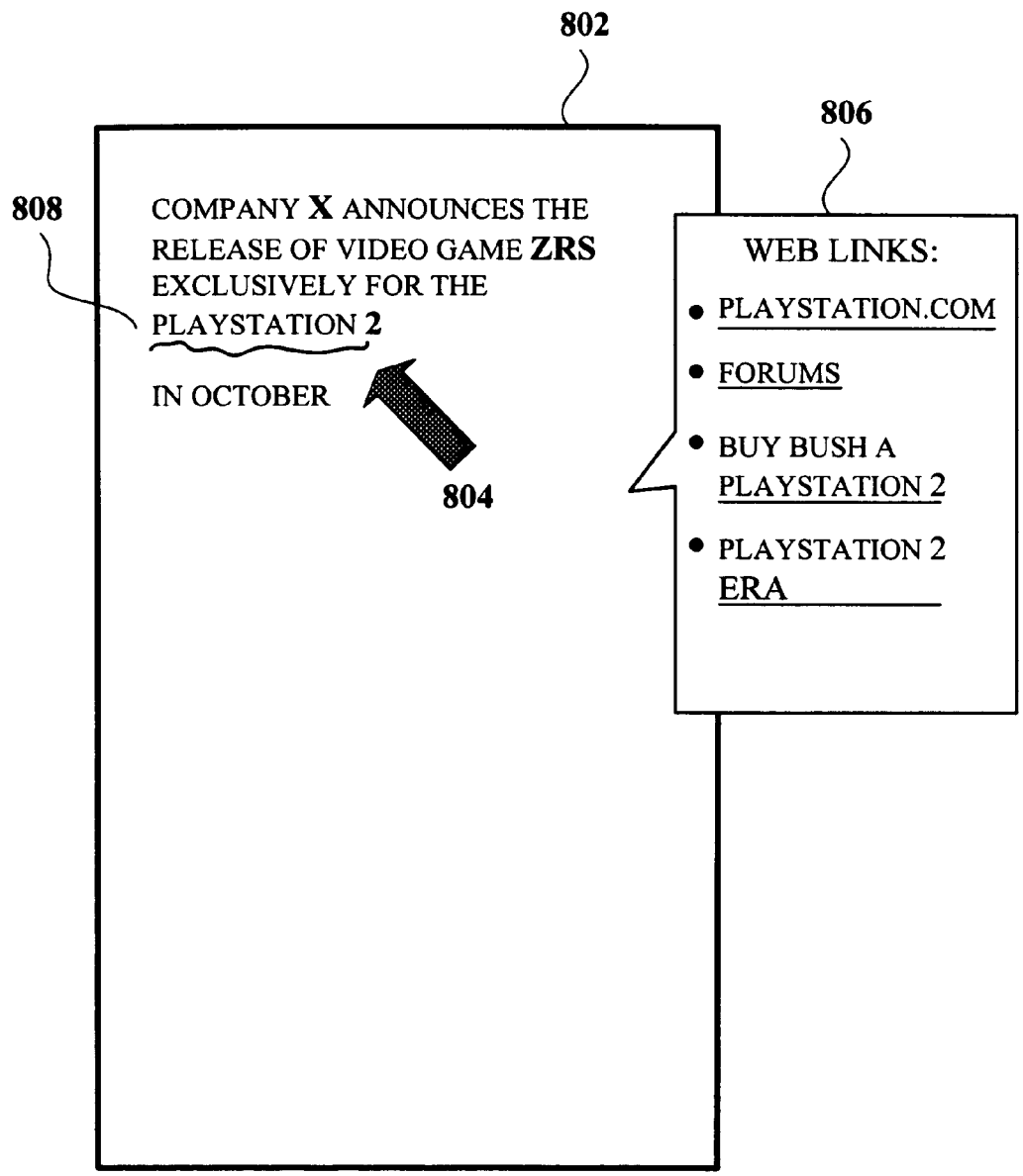
FIG. 8 is a schematic diagram of a pop-up GUI listing related information, in accordance with one embodiment of the present invention.

FIG. 8 is a schematic diagram of a pop-up GUI listing related information, in accordance with one embodiment of the present invention. After user actions and objects are recorded, the recorded user actions and recorded objects are provided to a search engine. Depending on the user's interests, selected recorded user actions and recorded objects (e.g., frequently repeated user actions and objects, objects with particular words, all user actions and recorded objects, etc.) are provided to the search engine. As a result, the search engine retrieves relevant Web links and displays the Web links on a monitor. There are various embodiments to display the relevant Web links. In one embodiment, as shown in FIG. 8, the Web links are listed in pop-up menu region 806. Here, the user places cursor 804 over object 808 with the term "Playstation 2." Consequently, pop-up menu region 806 listing Web sites related to object 808 is displayed. Pop-up menu region 806 may be incorporated into a variety of applications, such as word processing applications, Web browsers, etc. In another embodiment, instead of having a pop-up menu, the Web links may be displayed as a simple list in the main GUI described above.

Any number of suitable layouts can be designed for region layouts illustrated above as FIGS. 7 and 8 do not represent all possible layout options available. The displayable appearance of the regions can be defined by any suitable geometric shape (e.g., rectangle, square, circle, triangle, etc.), alphanumeric character (e.g., A, v, t, Q, 1, 9, 10, etc.), symbol (e.g., $, *, @, α, ⨎, ¤, ♥, etc.), shading, pattern (e.g., solid, hatch, stripes, dots, etc.), and color. Furthermore, for example, pop-up menu region 806 in FIG. 8, or any other region, may be omitted or dynamically assigned. It should also be appreciated that the regions can be fixed or customizable. In addition, the computing devices may have a fixed set of layouts, utilize a defined protocol or language to define a layout, or an external structure can be reported to the computing device that defines a layout. Finally, clicking on a region of GUI as discussed above triggers code to cause the functionality described herein.

In sum, the above described invention provides methods and systems for recording and utilizing a sequence of user actions made when interfacing with objects associated with executable codes. The recorded sequence of user actions may be utilized by a wide variety of suitable applications. For example, each time a music piece is played by music player applications (e.g., MP3 players, internet radio, etc.), the name of the music piece, the artist of the music piece, time played, etc. are recorded. At a later time, the recorded information can be retrieved and used to determine the user's music preferences (e.g., favorite songs, favorite styles, the times during the day at which the user prefers to listen to music, etc.). The user's music preferences can then be provided to an automated shopping application that finds similar music, automatically notifies the user when his favorite artist releases a new song, and automatically builds play lists for music to be played at certain preferable times of day.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A computer-implemented method for generating information related to user interfacing with interactive objects of an executable code, comprising:

receiving a definition for a selection of a level of detail to record relating to activity to be undertaken by a user when interfacing with interactive objects associated with the executable code, the level of detail acting to limit detection of certain interfacing with the interactive objects over time during one or more sessions;

recording a sequence of user actions over time during the multiple sessions, the recording being of active interfacing with the interactive objects associated with the executable code, the recorded sequence of user actions being limited by the selected level of detail;

parsing the recorded sequence of user actions by applying rules that are user selected that enable generation of a defined number of data types, the data types represent data about the recorded sequence of user actions and particular data types used as an input by an application that is designed to produce additional information related to one or more of the data types; and saving the data types and the additional information to storage for presentation on a graphical user interface of a display, the data types and the additional information resulting automatically from the user interfacing and is limited by the selected level of detail, wherein the recorded sequence of user actions can be edited and utilized by other programs to generate related information.

2. The computer-implemented method of claim 1, further comprising:

recording the interactive objects associated with the executable code, the recorded interactive objects being defined by the selected level of detail; and parsing the recorded interactive objects by applying rules that enable generation of a defined number of data types.

3. The computer-implemented method of claim 2, further comprising:

providing the data types to a search engine, the search engine retrieving the additional information that is related to one or more of the data types over a network; and displaying the additional information.

4. The computer-implemented method of claim 3, wherein the additional information that is related to one or more of the data types is generated without requiring detection of user initiated input, and the additional information is limited to the selected level of detail.

5. The computer-implemented method of claim 2, wherein each of the interactive objects associated with the executable code is defined by one of a command, an instruction, a hypertext link, a data, a data traversing network connections, an icon, a file, a picture file, a sound file, a movie file, a menu, and a text;

wherein each of the user actions is defined by one of a keyboard input, a mouse movement, a mouse input, a light pen input, a selection of a choice from a menu, a selection of an interactive object, a joystick input, or a selection of a command;

wherein the defined number of data types is defined by one or more of a program name, an inputted data, an icon name, a file name, a command name, a hypertext link name, a picture name, a Web address, an email text, a message text, or a sound name;

wherein the executable code is defined by one or more of an operating system, a video game, a Web browser, an applet, a word processor, a spreadsheet program, a search engine, a dictionary application, an encyclopedia application, an email program, or combination thereof; and wherein the application is defined by one or more of a search engine, an Internet music and movie shopping service, an encyclopedia application, or a dictionary application.

6. The computer-implemented method of claim 1, wherein each of the rules is defined by one of a user search request, a frequently repeated interactive object, a frequently repeated user action, and a specified length of time spent on the interactive objects.

* * * * *